(12) United States Patent
Batdorff

(10) Patent No.: US 8,196,943 B2
(45) Date of Patent: Jun. 12, 2012

(54) OVAL AXLE HOUSING AND CLAMP ASSEMBLY

(75) Inventor: Jonathan D. Batdorff, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 196 days.

(21) Appl. No.: 12/506,382

(22) Filed: Jul. 21, 2009

(65) Prior Publication Data

US 2011/0017014 A1    Jan. 27, 2011

(51) Int. Cl.
*B60G 11/00* (2006.01)
(52) U.S. Cl. ...... 280/124.175; 280/124.17; 280/124.164
(58) Field of Classification Search ............ 280/124.17, 280/124.175, 124.164; 74/607; 403/191
See application file for complete search history.

(56) References Cited

U.S. PATENT DOCUMENTS

| | | | | |
|---|---|---|---|---|
| 1,970,231 A | * | 8/1934 | Habicht | 74/607 |
| 1,991,988 A | * | 2/1935 | Spatta | 228/144 |
| 2,611,656 A | * | 9/1952 | Vanderberg | 301/124.1 |
| 5,303,985 A | | 4/1994 | Barnholt | |
| 5,366,238 A | * | 11/1994 | Stephens | 280/124.116 |
| 5,938,221 A | * | 8/1999 | Wilson | 280/124.163 |
| 6,032,967 A | | 3/2000 | Ogoniek | |
| 6,257,606 B1 | * | 7/2001 | Hynes et al. | 280/124.175 |
| 6,328,324 B1 | * | 12/2001 | Fenton | 280/124.163 |
| 6,454,283 B1 | * | 9/2002 | Fenton | 280/124.163 |
| 7,500,688 B2 | * | 3/2009 | Mullican et al. | 280/124.175 |
| 2001/0017451 A1 | * | 8/2001 | Smith et al. | 280/124.116 |
| 2005/0168057 A1 | * | 8/2005 | Eschenburg | 301/137 |
| 2006/0103103 A1 | * | 5/2006 | Land et al. | 280/124.163 |
| 2006/0175789 A1 | * | 8/2006 | Mullican et al. | 280/124.163 |
| 2007/0108717 A1 | * | 5/2007 | Stoesz et al. | 280/124.175 |
| 2008/0042393 A1 | * | 2/2008 | Humphreys | 280/124.175 |

* cited by examiner

*Primary Examiner* — Drew Brown
(74) *Attorney, Agent, or Firm* — Jeffrey P. Calfa; Mark C. Bach

(57) ABSTRACT

An axle housing (110) for clamping with a clamp assembly (118, 218) to a spring (16, 216) of a suspension system (14) of a vehicle, the clamp assembly having at least two U-bolts (120, 220) each having a curved portion (136, 236) and two generally linear legs (128, 228) extending therefrom, and a clamping plate (122, 222) for receiving and attaching the legs of the U-bolts to form an enclosure that clamps the axle housing (110) to the spring (16, 216), the housing having a generally oval shape in cross section. The axle housing (110) has a generally planar fore side (132), a generally planar aft side (134), a generally rounded top surface (144) and a generally rounded bottom surface (146), wherein at least one of the top surface and the bottom surface are sized and arranged to mate flushly with the curved portion (136) of the U-bolts (120).

15 Claims, 3 Drawing Sheets

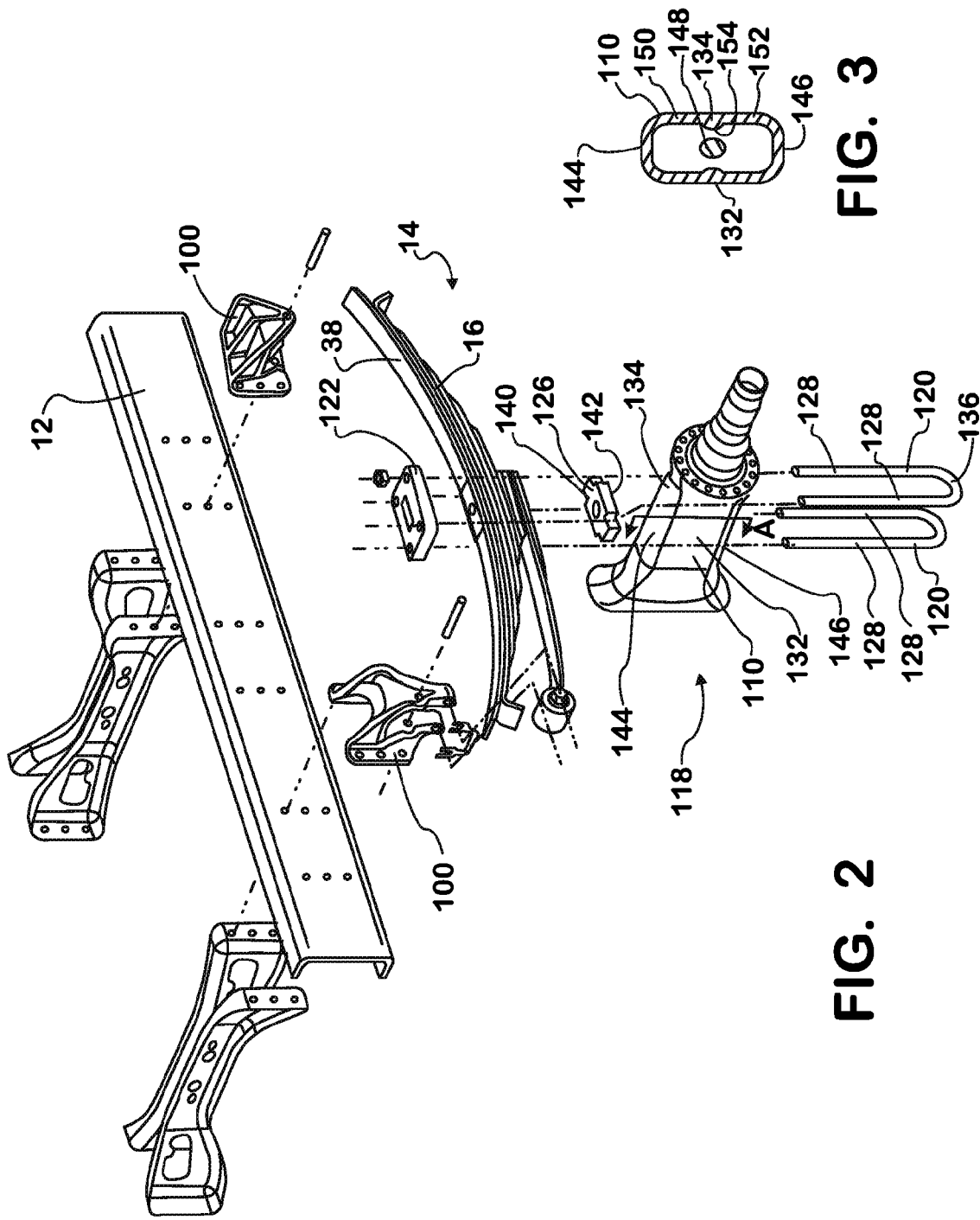

OVAL AXLE HOUSING AND CLAMP ASSEMBLY

BACKGROUND

Embodiments disclosed herein relate generally to suspension systems of vehicles. More particularly, the embodiments relate to clamp assemblies for attaching axle housings to suspension systems of vehicles.

Suspension systems provide comfort to the occupants of vehicles. The basic function of the suspension system is to provide a flexible support for the vehicle so that the occupants are isolated from a non-planar or imperfect road surface while stabilizing the vehicle under various operating conditions.

Axle housings are suspended from vehicle frames with clamp assemblies. The clamp assemblies clamp the axle housing to a spring of the suspension system. In a leaf spring suspension system, the spring is attached at its two ends to the vehicle frame with hanger brackets, and a center portion of the spring is attached to the clamp assembly. The clamp assembly includes two U-bolts which confine the axle housing with a clamping plate, and clamp the axle housing against the spring.

Axle housings are typically cylindrical or rectangular/square in cross-section. To prevent relative rotation of the axle housing with respect to the clamp assembly, especially during acceleration and braking, rectangular/square axle housings are used. The rectangular/square axle housings are disposed in a flush arrangement between the linear legs of the U-bolts.

In this configuration, the curved portion of the U-bolts encircle the flat, top surface of the spring. However, flush contact between the curved portion of the metal U-bolt and another component maintains the shape of the U-bolt and provides sufficient clamping force. Axle saddles are used for this purpose. The axle saddle is disposed between the curved portion of the U-bolt and the spring. The axle saddle has a curved surface that abuts the curved U-bolt, and a flat surface that abuts the flat surface of the spring. Often, more than one axle saddle is used to provide flush contact between the U-bolt, the spring and the axle housing.

SUMMARY

An axle housing for clamping with a clamp assembly to a spring of a suspension system of a vehicle, the clamp assembly having at least two U-bolts each having a curved portion and two generally linear legs extending therefrom, and a clamping plate for receiving and attaching the legs of the U-bolts to form an enclosure that clamps the axle housing to the spring, the housing having a generally oval shape in cross section. The axle housing has a generally planar fore side, a generally planar aft side, a generally rounded top surface and a generally rounded bottom surface, wherein at least one of the top surface and the bottom surface are sized and arranged to mate flushly with the curved portion of the U-bolts.

BRIEF DESCRIPTION OF THE DRAWINGS

FIG. 2 is an exploded perspective view of an oval axle housing mounted on the frame with a leaf spring and a U-bolt.

FIG. 3 is a section view of the axle housing and axle shaft taken along line A-A of FIG. 2.

DETAILED DESCRIPTION

Figure 1:
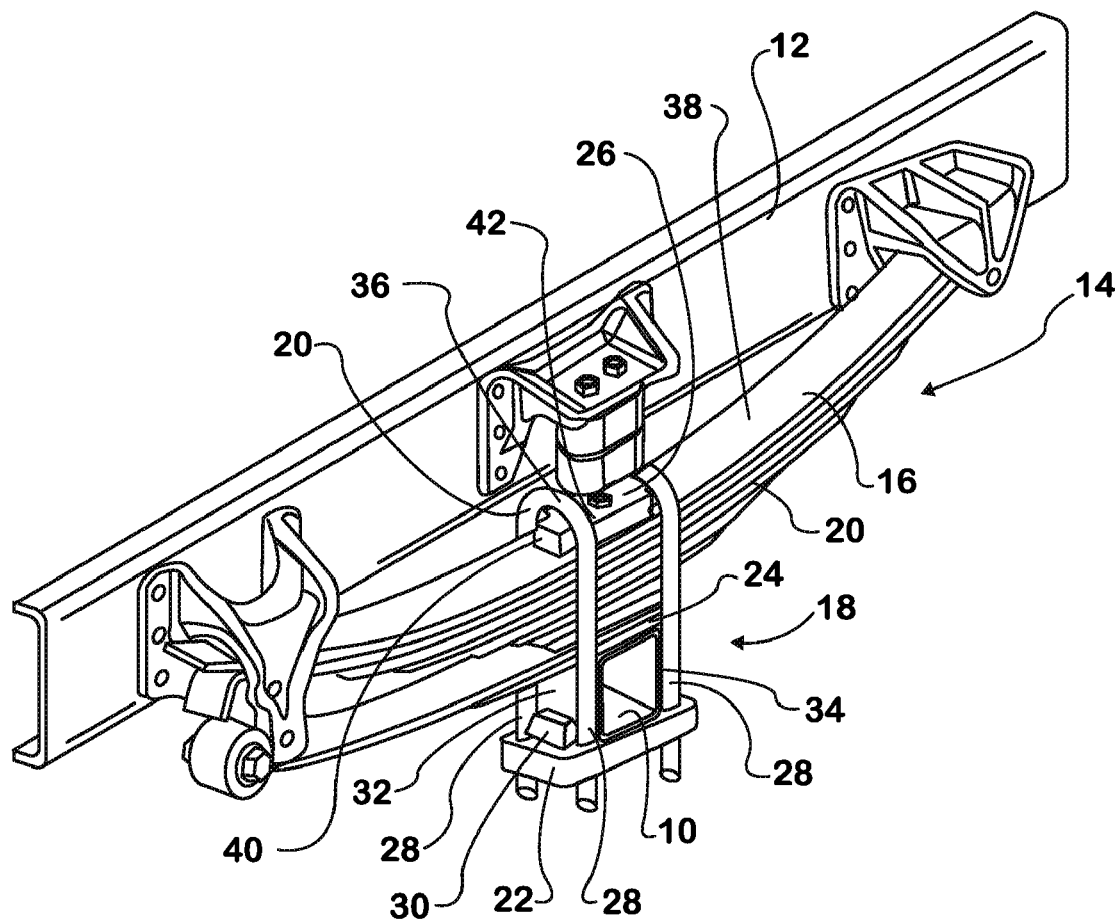
FIG. 1 is a perspective view of a prior art axle housing mounted on frame with a leaf spring, U-bolt and axle saddle.

Referring to FIG. 1, an axle housing 10 is generally square or rectangular shaped, and is mounted on a vehicle frame rail 12 through a suspension system, indicated generally at 14. Specifically, the axle housing 10 is supported on a leaf spring 16 with a clamp assembly 18 that includes two U-bolts 20, a clamping plate 22, an axle shim 24 and an axle saddle 26.

The two U-bolts 20 are spaced and in a parallel arrangement encircling the leaf spring 16. Two legs 28 of each U-bolt 20 are received by and fastened to the clamping plate 22, and the axle housing 10 is mounted between the two sets of legs 28. A stop 30 positively locates the axle housing 10 in the middle of the clamping plate 22 and between the legs 28. The legs 28 of the U-bolts 20 are generally linear, but do not abut the planar fore side 32 and aft side 34 of the square axle housing 10. The legs 28 do not prevent rotation of the axle housing 10 with respect to the clamp assembly 18. In this configuration, the axle housing 10 is clamped between the clamping plate 22 and the leaf spring 16, which prevents rotation.

At a curved portion 36 of each U-bolt 20, the axle saddle 26 is disposed between the U-bolt 20 and a top, flat surface 38 of the leaf spring 16. The axle saddle 26 has a generally flat side 40 to abut the leaf spring 16, and a generally curved side 42 to approximate the curvature of the U-bolt 20. The axle saddle 26 is used to provide flush contact with the U-bolt 20 and the leaf spring 16, which in turn maintains the shape and consistency of the U-bolt and provides a better clamping force.

Referring now to FIG. 2 and FIG. 3, an axle housing is indicated at 110. The axle housing 110 has a generally oval-shape in cross-section, and is clamped to the leaf spring 16 of a suspension system 14 with a clamp assembly 118. The clamp assembly 118 includes two U-bolts 120 in a spaced and parallel arrangement, a clamping plate 122 mounted on a top surface 38 of the spring 16, and an axle saddle 126 on the opposite side of the spring from the clamping plate. Suspension hangers 100 attach the leaf spring 16 to the frame rail 12 at the ends of the spring. Together with the clamping plate 122, the U-bolts 120 attach the axle housing 110 to the leaf spring 16.

Two legs 128 of each U-bolt 120 are received by and fastened to the clamping plate 122, such as with fasteners. The axle housing 110 is mounted between the two legs of each U-bolt. When the U-bolt 120 is attached to the clamping plate 122, a closed U-shape enclosure is formed around the axle housing 110, and in the direction transverse to the axle housing. Each of the legs 128 of the U-bolt 120 are generally linear, one of the two legs abutting a planar fore side 132 of the axle housing 110, and the second of the two legs abutting a planar aft side 134 of the axle housing 110. In this arrangement, the axle housing is prevented from rotation with respect to the U-bolts 120.

A top surface 144 of the axle housing 110 and a bottom surface 146 of the axle housing are each rounded to approximate the curvature of the U-bolt 120. In other words, the outer radius of the top surface 144 and the bottom surface 146 is generally the same or slightly smaller than the inner radius of the curved portion 136 of the U-bolt 120 such that the axle housing mates flushly with or is cradled by the curved portion of the U-bolt. Further, the outer radius of the top surface 144 is generally the same as the outer radius of the bottom surface 146.

The axle housing 110 is clamped between the U-bolt 120 and the axle saddle 126, which has a generally flat side 140 to abut the leaf spring 16 and a generally curved side 142 to approximate the curvature of the top surface 144 of the axle housing. The outer radius of the top surface 144 of the axle housing 110 and the bottom surface 146 of the axle housing 110 is generally the same or slightly smaller than the inner radius of the curved side 142 of the axle saddle 126.

As compared to the orientation in FIG. 1, the U-bolt 120 of the clamp assembly 118 of FIG. 2 is inverted. The inversion of the U-bolt 120 provides for easier installation on the vehicle.

If a square or rectangular axle housing were used with the clamp assembly 118 of FIG. 2, a second axle saddle would be needed to provide flush contact at a curved portion 136 of the U-bolt 120 with the bottom surface 146 of the axle housing. However, with the oval axle housing 110, no second axle saddle is needed. Further, no shim is needed to clamp the oval axle housing 110 to the frame rail 12. Thus, the clamp assembly 118 of FIG. 2 provides a reduction in component parts. Additionally, the oval axle housing 110 facilitates a better fit at the interface between the axle housing and the U-bolt 120, which can result in a reduction of U-bolt stretch. Less stretch in the U-bolt 120 can result in decreased problems with all the clamping components.

The oval axle housing 110 is formed in two parts around an axle shaft 148. A first portion 150 is welded to a second portion 152 with a flush weld 154 at the fore and aft surfaces 132, 134 of the axle housing 110 so as not to interfere with the flush contact between the axle housing and the legs 128 of the U-bolt 120. The first portion 150 and the second portion 152 are symmetrical components that are generally centered about the axle shaft 148. It is contemplated that other methods of attachment of the first and second portions 150, 152 can be used, and alternatively, an integrally formed housing can be used.

Figure 4:
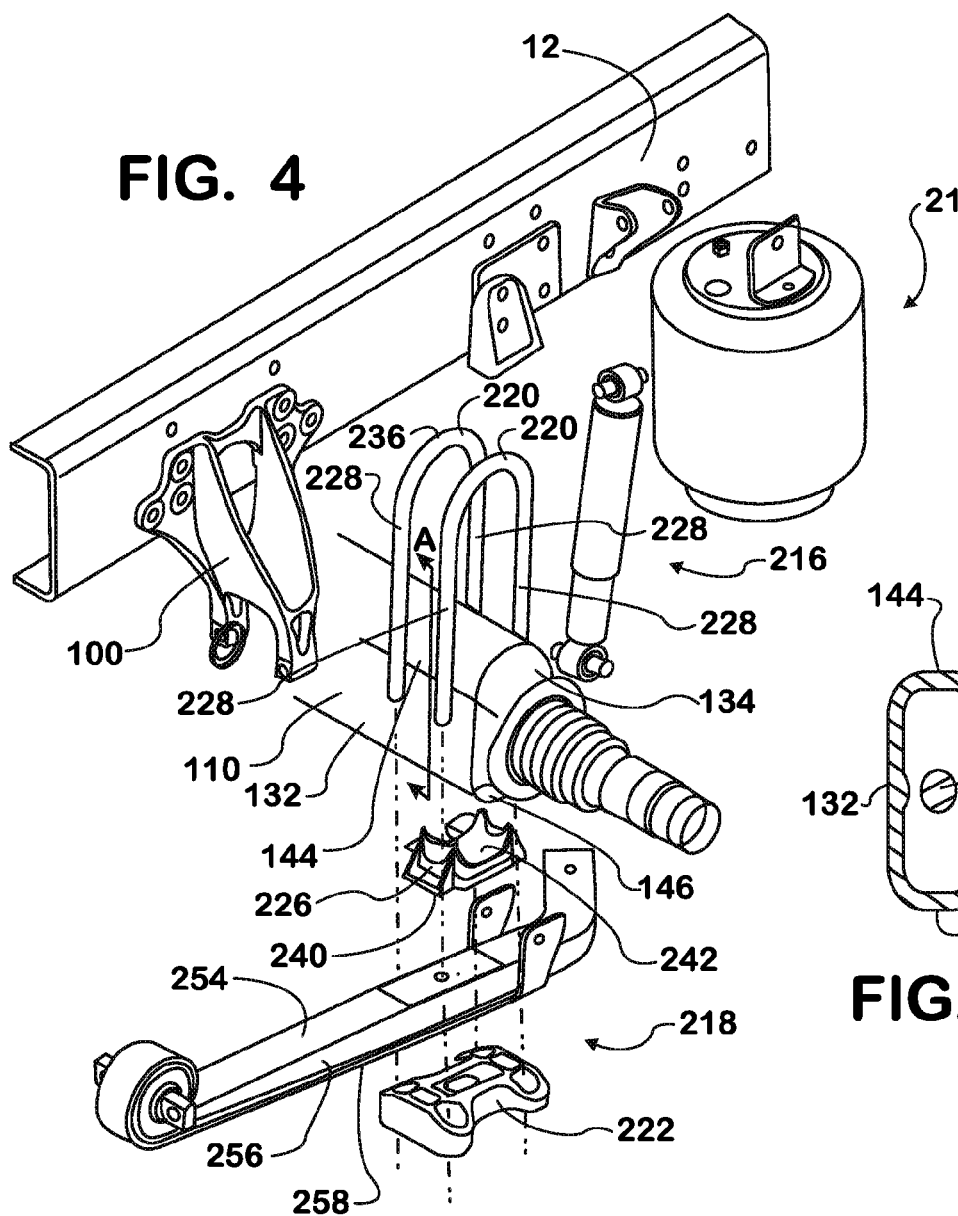
FIG. 4 is an exploded perspective view of the oval axle housing mounted on the frame with an air spring.
Figure 5:
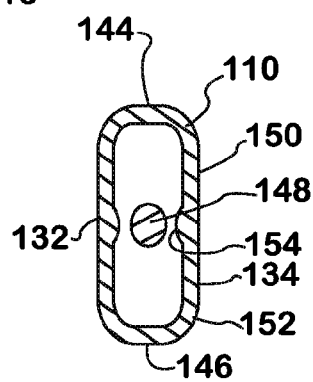
FIG. 5 is a section view of the axle housing and axle shaft taken along line A-A of FIG. 4.

Referring now to FIG. 4 and FIG. 5, the oval axle housing 110 is clamped on to an air spring assembly 216 of a suspension system 214 with a second embodiment of clamp assembly 218, which includes two U-bolts 220, a clamping plate 222 and an axle saddle 226. As with the first embodiment of clamp assembly 118 in FIG. 2, the oval axle housing 110 is welded with a flush weld 154 so as to provide a planar fore side 132 and a planar aft side 134 of the axle housing.

In the clamp assembly 218 of FIG. 4, the U-bolts 220 are not inverted as in the clamp assembly 118 of FIG. 2. Two legs 228 of each U-bolt 220 are received by and fastened to the clamping plate 222, and the axle housing 110 is mounted between the two sets of legs. To prevent the relative rotation of the axle housing 110 to the clamp assembly 216, the legs 228 of the U-bolt 220 are generally linear and abut the planar fore side 132 and the planar aft side 134 of the axle housing.

The top surface 144 of the axle housing 110 is rounded to approximate the curvature of the U-bolt 220, and is received in the curved portion 236 of the U-bolts. Similar to the embodiment of FIG. 2, the outer radius of the top surface 144 and the bottom surface 146 is generally the same or slightly smaller than the inner radius of the curved portion 236 of the U-bolt 220 such that the axle housing mates flushly with or is cradled by the curved portion of the U-bolt.

The bottom surface 146 of the axle housing 110 is received in an axle saddle 226. The axle saddle 226 has a generally flat side 240 to abut the top surface 254 of the arm 256 of the air spring assembly 216. Opposite the generally flat side 240, the axle saddle 226 has a generally curved side 242 to approximate the curvature of the bottom surface 146 of the axle housing 110.

On a bottom surface 258 of the arm 256, the clamping plate 222 receives the legs 228 of the U-bolts 220. Fasteners can be used to secure the legs 228 to the clamping plate 222. It contemplated that the clamping plate 222 can have any shape that corresponds to the bottom surface 258 of the arm 256.

What is claimed is:

1. A clamp assembly for a suspension system of a vehicle having a spring, comprising:
    an axle housing having a generally oval-shaped cross-section at an area of contact with the clamp assembly, including a generally planar fore side, a generally planar aft side, a generally rounded top surface and a generally rounded bottom surface;
    at least two U-bolts each having a curved portion and two generally linear legs extending therefrom, wherein one of the rounded top surface and the rounded bottom surface of the axle housing is received in the curved portion of the U-bolt, and wherein the planar fore side and the planar aft side of the axle housing are confined from rotation relative to the U-bolt by the legs of each U-bolt, wherein the planar fore side and the planar aft side of the axle housing each contact the linear legs of the U-bolt, and the generally rounded top surface of the axle housing is sized and arranged to flushly mate with the curved portion of the U-bolt, such that greater than half of the perimeter of the axle housing contacts the U-bolts;
    a clamping plate for receiving and attaching the legs of the U-bolts to form an enclosure that encloses the axle housing; and
    an axle saddle having a curved side that is sized and arranged to flushly mate with one of the rounded top surface and the rounded bottom surface of the axle housing;
    wherein substantially the entire perimeter of the axle housing contacts either the U-bolts or the axle saddle.

2. The clamp assembly of claim 1 wherein the spring is a leaf spring.

3. The clamp assembly of claim 1 wherein the spring is an air spring.

4. The clamp assembly of claim 1 wherein the curved side of the axle saddle further comprises four upwardly extending cradle fingers, wherein the cradle fingers define a generally continuous curvature of the curved side of the axle saddle that flushly mates with the generally oval-shaped axle housing.

5. The clamp assembly of claim 1 wherein the curved portion of the U-bolts are sized and arranged to flushly mate with the bottom surface of the axle housing, and an axle saddle having a curved side is sized and arranged to flushly mate with the top surface of the axle housing.

6. The clamp assembly of claim 5 wherein the axle saddle has a generally flat side opposite of the curved side, the flat side abutting the spring.

7. The clamp assembly of claim 6 wherein the clamping plate abuts the spring on the opposite side of the spring from the axle saddle.

8. The clamp assembly of claim 1 wherein the axle saddle has a generally flat side opposite of the curved side.

9. The clamp assembly of claim 8 wherein the clamping plate abuts the spring on the opposite side of the spring from the axle saddle.

10. The clamp assembly of claim 1 wherein the axle housing has a first portion attached to a second portion with a flush weld.

11. A clamp assembly for a suspension system of a vehicle having a spring and an arm supporting the spring, comprising:
    an axle housing having a generally oval-shaped cross-section at an area of contact with the clamp assembly, including a generally planar fore side, a generally planar aft side, a generally rounded top surface and a generally rounded bottom surface, wherein the axle housing has a first portion comprising the rounded top surface and portions of the planar fore side and the planar aft side, and a second portion comprising the rounded bottom surface and portions of the planar fore side and the planar aft side, wherein the first portion is attached to the second portion with a flush weld at the planar fore side, and with a flush weld at the planar aft side;

two U-bolts each having a curved portion and two generally linear legs extending therefrom, wherein the axle housing is disposed between the two legs of each of the U-bolts, and one of the rounded top surface and the rounded bottom surface of the axle housing is received in the curved portion of the U-bolt in a flush mating engagement, wherein the fore side and the aft side of the axle housing abut the legs of the U-bolt substantially along the length of the fore side and the aft side;

a clamping plate disposed on the opposite side of the arm from the axle housing, wherein the clamping plate receives the legs of the U-bolts; and an axle saddle having a curved side that is sized and arranged to flushly mate with one of the rounded top surface and the rounded bottom surface of the axle housing, wherein the curved side has four upwardly extending cradle fingers, wherein the cradle fingers define a generally continuous curvature of the curved side of the axle saddle that flushly mates with the generally oval-shaped axle housing.

12. The clamp assembly of claim 11 wherein the spring is an air spring.

13. The clamp assembly of claim 11 wherein the axle saddle is disposed on the opposite side of the arm from the clamping plate.

14. The clamp assembly of claim 11 wherein the axle housing is generally perpendicular to the arm, and a first U-bolt is disposed on a first side of the arm and a second U-bolt is disposed on a second side of the arm opposite of the first side, and wherein one leg of each U-bolt abuts the fore side of the axle housing and one leg of each U-bolt abuts the aft side of the axle housing.

15. The clamp assembly of claim 11 wherein the first portion and the second portion are symmetrical.

* * * * *